(12) United States Patent
Lachance et al.

(10) Patent No.: US 11,364,990 B2
(45) Date of Patent: Jun. 21, 2022

(54) VARIABLE PITCH PROPELLER CONTROL SYSTEM

(71) Applicant: PRATT & WHITNEY CANADA CORP., Longueuil (CA)

(72) Inventors: Benoit Lachance, Mississauga (CA); Ignazio Broccolini, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 436 days.

(21) Appl. No.: 16/055,549

(22) Filed: Aug. 6, 2018

(65) Prior Publication Data

US 2020/0039635 A1 Feb. 6, 2020

(51) Int. Cl.
*B64C 11/38* (2006.01)

(52) U.S. Cl.
CPC .................................. *B64C 11/385* (2013.01)

(58) Field of Classification Search
CPC ........ B64C 11/38; B64C 11/385; B64C 11/40
See application file for complete search history.

(56) References Cited

U.S. PATENT DOCUMENTS

| 2,557,333 | A | | 6/1951 | Zwack | |
|---|---|---|---|---|---|
| 2,840,171 | A | | 6/1958 | Jedrziewski | |
| 3,004,608 | A | * | 10/1961 | Pond | B64C 11/40 416/47 |
| 4,969,367 | A | | 11/1990 | Huber et al. | |
| 6,422,816 | B1 | | 7/2002 | Danielson | |
| 2010/0135799 | A1 | * | 6/2010 | Morgan | F04D 27/0246 416/44 |
| 2019/0092453 | A1 | * | 3/2019 | Hoemke | B64C 11/40 |
| 2020/0039635 | A1 | * | 2/2020 | Lachance | B64C 11/385 |

FOREIGN PATENT DOCUMENTS

| EP | 3257744 | 12/2017 |
|---|---|---|
| GB | 800909 | 9/1958 |

* cited by examiner

*Primary Examiner* — Christopher R Legendre
(74) *Attorney, Agent, or Firm* — Norton Rose Fulbright Canada LLP

(57) ABSTRACT

The variable pitch propeller control system can have a source of adjustable, actuation hydraulic pressure, a feather valve openable to provide an actuation path of the actuation hydraulic pressure between the source and the actuator, and closeable to connect the actuator to a drain below the actuation hydraulic pressure and close the actuator path, and a bypass path parallel to the actuator path, the bypass path having a restricted flow area relative to a flow area of the actuator path.

19 Claims, 3 Drawing Sheets

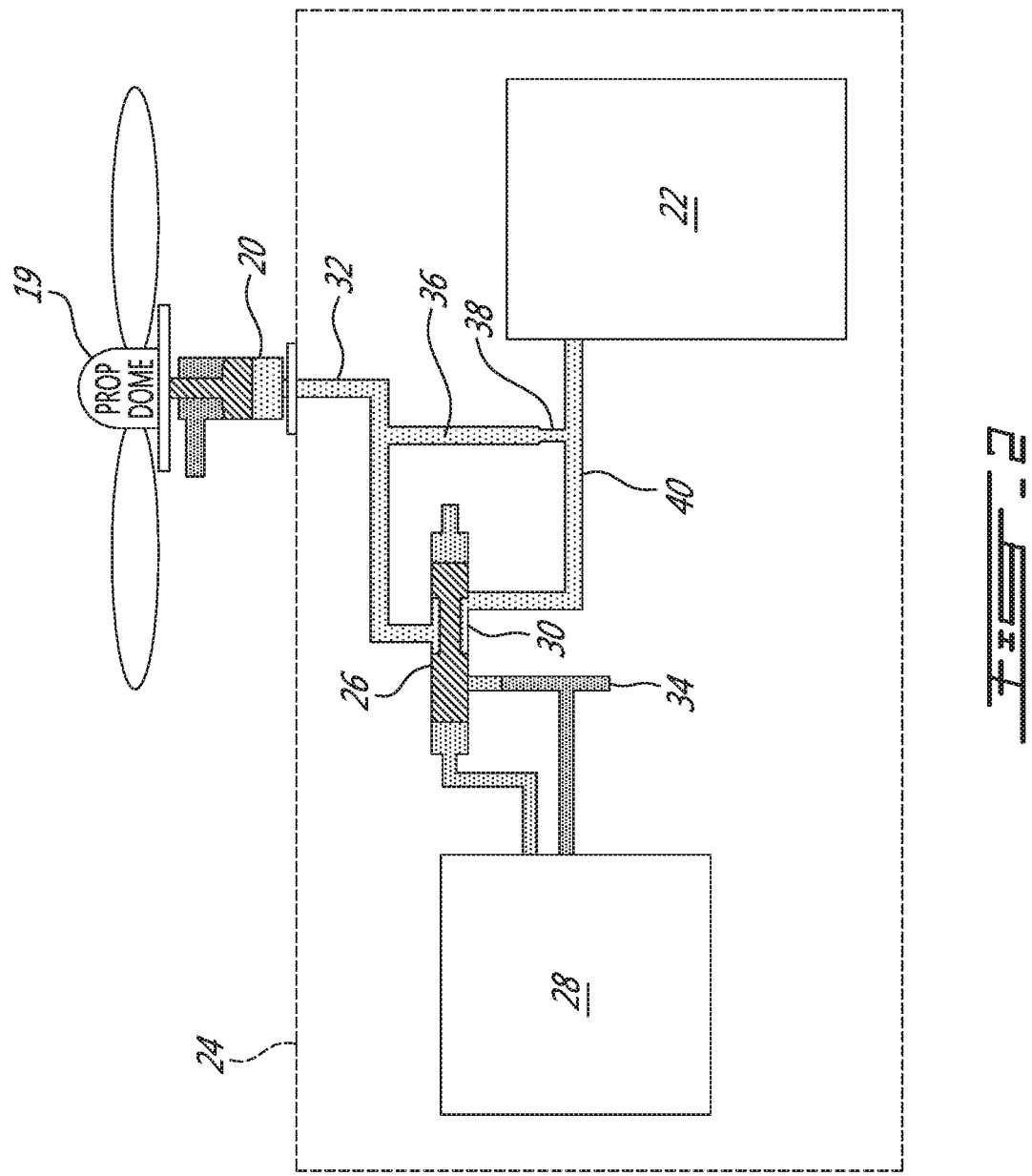

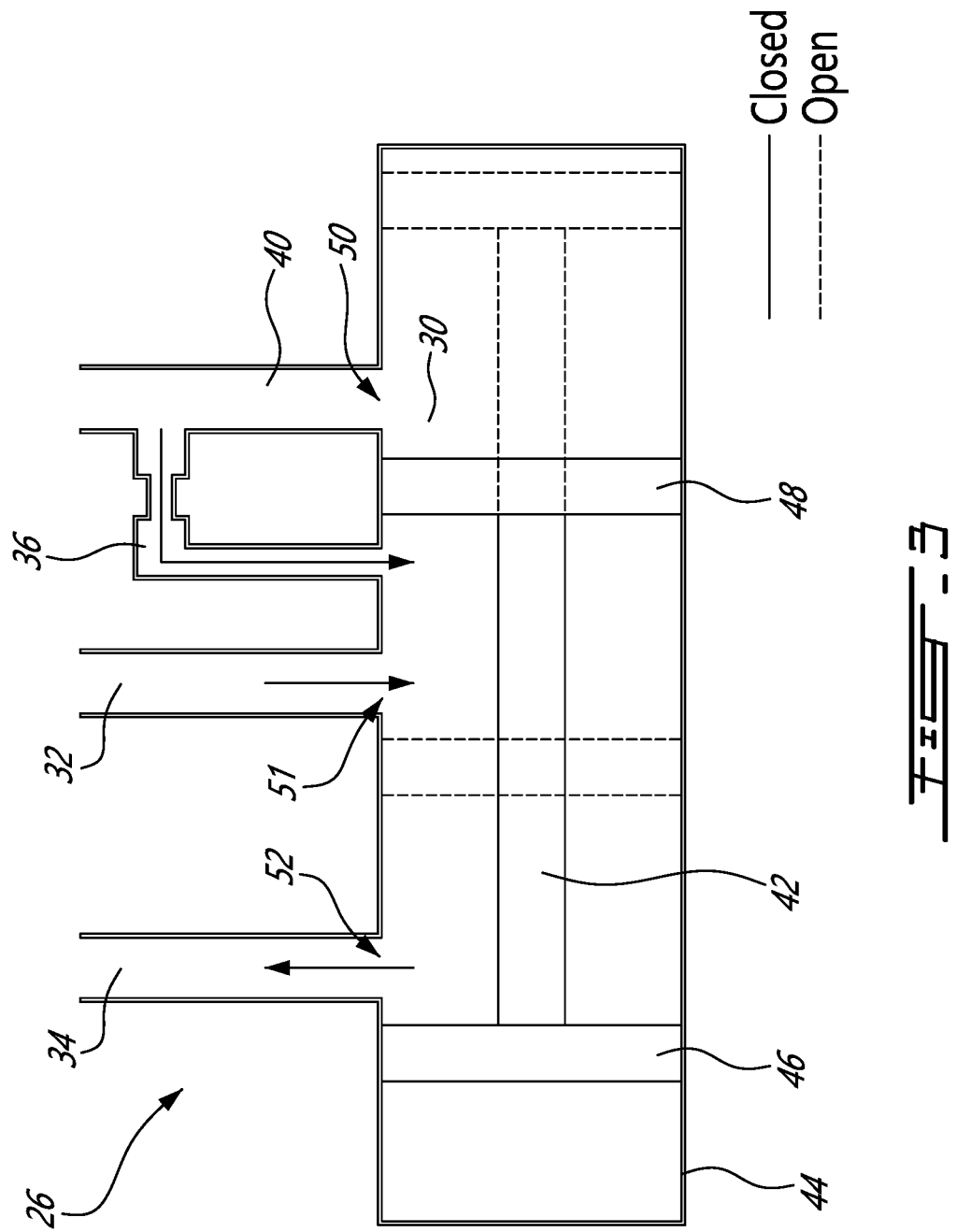

VARIABLE PITCH PROPELLER CONTROL SYSTEM

TECHNICAL FIELD

The application related generally to aircraft engines and, more particularly, to aircraft engines having variable pitch propellers.

BACKGROUND OF THE ART

While existing variable pitch propeller systems were satisfactory to a certain degree, there remained room for improvement. Indeed, in some variable pitch propeller systems, when the engine was operated for a relatively long time at relatively cold temperatures, the oil coming back through the feather valve from the pitch actuator when feathering can be cold and viscous causing pressure losses through the feather valve, and a notable effect on feather rate. This could lead to overdesigning feather valves in a manner to account for this effect, which was otherwise undesirable due to associated additional costs and/or weight.

SUMMARY

In one aspect, there is provided an aircraft engine having a variable pitch propeller, an actuator to control the pitch of blades of the variable pitch propeller, a source of adjustable, actuation hydraulic pressure, a feather valve openable to provide an actuation path of the actuation hydraulic pressure between the source and the actuator, and closeable to block the actuation path and connect the actuator to a drain below the actuation hydraulic pressure, and a bypass path parallel to the actuator path and restricted relative to the actuator path.

In another aspect, there is provided a variable pitch propeller control system for a propeller having an actuator to control the pitch of blades, the variable pitch propeller control system comprising a source of adjustable, actuation hydraulic pressure, a feather valve openable to provide an actuation path of the actuation hydraulic pressure between the source and the actuator, and closeable to connect the actuator to a drain below the actuation hydraulic pressure and close the actuator path, and a bypass path parallel to the actuator path, the bypass path having a restricted flow area relative to a flow area of the actuator path.

In a further aspect, there is provided a method of operating a variable pitch propeller, the method comprising: conveying an actuation hydraulic pressure of hydraulic fluid from a source to an actuator controlling the pitch of blades of the propeller; operating a feather valve to connect the actuator to a drain, thereby releasing the hydraulic pressure in the actuator, and causing a reverse flow of hydraulic fluid from the actuator towards the drain, while simultaneously feeding a limited flow rate of hydraulic fluid, below the actuation hydraulic pressure, from the source to the drain, into the reverse flow and across the feather valve.

DESCRIPTION OF THE DRAWINGS

Reference is now made to the accompanying figures in which:

FIG. 2 is a block diagram showing an example of a variable pitch propeller control system;

FIG. 3 is a cross-sectional schematic view of a feather valve.

DETAILED DESCRIPTION

Figure 1:
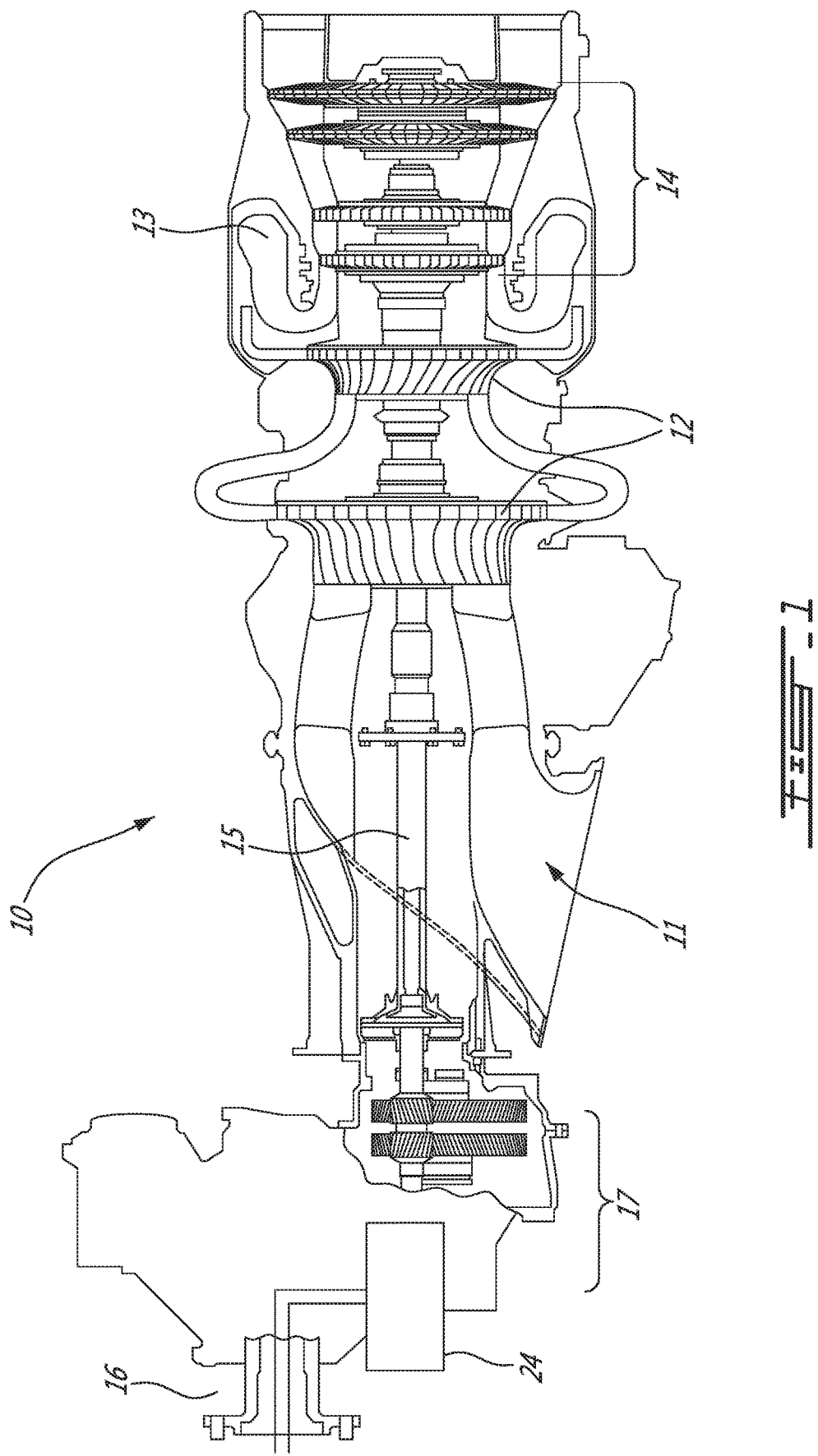
FIG. 1 is a schematic cross-sectional view of a gas turbine engine.

FIG. 1 illustrates an example of a gas turbine engine. In this example, the gas turbine engine is a gas turboprop engine 10 of a type preferably provided for use on an aircraft designed for subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects forwardly to transmit a driving force to a propeller shaft 16 via a reduction gearbox generally shown at 17.

In this embodiment, the propeller is a variable pitch propeller 19 in which the angle of inclination of the chord of the blade around an axis extending along the length of the blade (i.e. blade pitch), can be adjusted. The angle is typically qualified in terms of the amount of "bite" the blade takes in the air during rotation. Accordingly, an angle which is near vertical takes a very small bite into the air and is referred to as a small angle, or as a fine pitch. A greater angle is referred to as a coarser pitch. During typical operation of the engine, the angle can be finely adjusted to lower pitch when good low speed acceleration (and climb rate) are desired, and to higher pitch when higher speed performance and fuel efficiency are desired. In this embodiment, the blade pitch is controlled by an actuator 20 which is powered via a source of adjustable hydraulic pressure 22.

FIG. 2 shows an example of a variable pitch control system 24 including a source 22 of adjustable hydraulic pressure used to power an actuator 20. The source 22 allows to vary the hydraulic pressure within given range which lies above a threshold of actuation hydraulic pressure sufficient to power the actuator 20, and move the pitch away from the coarsest position. The pitch of the blades will vary depending on the hydraulic pressure. This process can be referred to as fine pitch pressure control.

If an engine fails, its non-functioning propeller can cause undesired drag on the aircraft. A feathering system is provided with the variable pitch control system 24 to allow moving the blade orientation to the coarsest position, which can be horizontal or near horizontal, in an effort to minimize such unwanted drag. This process can be referred to as feathering. To this end, the variable pitch control system 24 further includes a feather valve 26 and a feather controller 28 to control the feather valve 26.

During the fine pitch pressure control, the feather valve 26 can be operated to communicate actuation hydraulic pressure between the source 22 and the actuator 20 to power the actuator 20. This latter path of oil across the feather valve 26 will be referred to as the actuation path 30, and the position of the feather valve permitting the the actuation hydraulic pressure to pass along the actuation path will be referred to as the open position. During feathering, the feather valve 26 can be operated to disconnect the actuator 20 from the source 22, blocking the actuation path 30, and to release the hydraulic pressure in the actuator line 32 by connecting the actuator 20 to a drain 34 which is below the actuator hydraulic pressure threshold. The position of the feather valve during feathering will be referred to as the closed position. This causes a flow of hydraulic fluid from the actuator 20 to the drain 34 as the pitch of the blades is moved to the coarsest orientation, referred to as feather. The rate at which the pitch can move towards feather is referred to as the feather rate. During long flights, at cold temperatures, the oil in the actuator 20 can become cold and more viscous than when it is warmer. This can reduce feather rate.

In this example, a bypass path 36 is provided which allows a limited flow rate of warmer hydraulic fluid from the source 22 to mix into the reverse flow of hydraulic fluid and increase its temperature. Accordingly, a warmer flow of oil can be allowed across the feather valve 26 leading to an increased feather rate. However, if too much oil is allowed via the bypass path 36, the pressure of the source 22 will communicate to the actuator line 32 across the bypass path 36. To this end, the bypass path 36 can be provided with a restricted area, which can be in the form of a choked section 38, for instance. Indeed, the restricted area of the bypass path will be significantly smaller than the area of the actuator path, the latter being designed to allow a greater flow rate, and actuation pressure communication, across the feather valve. The exact preferred choice of bypass path area will be design-specific. The bypass path 36 can be said to be parallel to the actuation path 30, in the sense that both the bypass path 36 and the actuation path 30 provide independent connections between the actuator line 32 and the source line 40. The bypass path 36 can thus remain open independently of the closed state of the feather valve 26 and actuation path 30. In this embodiment, the bypass path 36 extends along a bypass line forming a permanent connection, and the bypass line does not contain a valve.

In this embodiment, the feather valve 26 includes a valve body 42 slidably housed within a casing 44. A more detailed example of a feather valve 26 is shown in FIG. 3. The casing 44 has an inlet 50, a first outlet 51, and a second outlet 52. The valve body 42 has at least one partition member 46, 48, with two opposite partition members 46, 48 being used in this case. When the feather valve 26 is operated to open the actuation path 30, as shown in dashed lines in FIG. 3, the first partition member 46 separates the actuator line 32 from the drain line 34, and the cavity/spacing between the two partition members 46, 48 connects the supply line 40 to the actuator line 32. As shown in FIG. 2 or 3, the bypass path 36 can remain connected between the supply line 40 and the actuator line 32 in the open configuration, either directly or via the cavity.

When the feather valve 26 is closed as shown in full lines in FIG. 3, the second partition member 48 separates the supply line 40 from the actuator line 32 without separating the bypass line 36 from the actuator line 32, and the actuator line 32 is placed in communication with the drain line 34 via the cavity/spacing between the partition members 46, 48.

The above description is meant to be exemplary only, and one skilled in the art will recognize that changes may be made to the embodiments described without departing from the scope of the invention disclosed. For example, other forms of feather valves than those illustrated can be used, and any suitable form of adjustable actuation hydraulic pressure can be used to power the actuator. The bypass path can be provided in the form of a bypass line parallel to the feather valve as illustrated, or can alternately be provided in the form of a conduit or spacing between parts in the body of the feather valve itself. The bypass path can be permanent, or can alternately be provided with a valve which closes the bypass path when the feather valve is open. In the illustrated embodiments, a permanent bypass path was preferred for simplicity. Still other modifications which fall within the scope of the present invention will be apparent to those skilled in the art, in light of a review of this disclosure, and such modifications are intended to fall within the appended claims.

The invention claimed is:

1. An aircraft engine having a variable pitch propeller comprising:
   an actuator to control the pitch of blades of the variable pitch propeller, the blades having a feather position and a plurality of other positions different than the feather position;
   a source of adjustable actuation hydraulic pressure hydraulically connected to the actuator and operable to vary a hydraulic pressure of a hydraulic fluid fed to the actuator for controlling the pitch of the blades;
   a feather valve having a casing and a valve body movably received within the casing, the feather valve having an inlet hydraulically connected to the source of adjustable actuation hydraulic pressure, a first outlet hydraulically connected to the actuator, and a second outlet hydraulically connected to a drain having a pressure below the actuation hydraulic pressure, the valve body movable within the casing between an open position of the feather valve and a closed position of the feather valve, the open position permitting the actuation hydraulic pressure to pass along an actuation path in the feather valve from the source to the actuator through the feather valve via the inlet and the first outlet while the inlet is hydraulically disconnected from the second outlet, the feather valve being in the open position for each of the plurality of other positions of the blades,
   the closed position blocking the actuation path and hydraulically connecting, via the first outlet and the second outlet, the actuator to the drain, the feather valve being in the closed position in the feather position of the blades, the inlet hydraulically disconnected from the first outlet in the closed position; and
   a bypass path in parallel with the actuation path and restricted relative to the actuation path, the actuator hydraulically connected, via the bypass path, to the source of the adjustable actuation hydraulic pressure independently of whether the feather valve is in the open position or the closed position.

2. The aircraft engine of claim 1 wherein the bypass path forms a permanent, limited flow rate hydraulic connection from the source to the actuator when the feather valve is in the closed position.

3. The aircraft engine of claim 1 wherein the bypass path has a choke section having a restricted area compared to an area of the actuation path.

4. The aircraft engine of claim 1 wherein the valve body has at least one partition member, and wherein when the feather valve is in the open position, the at least one partition member hydraulically separates the actuator from the drain, and wherein when the feather valve is in the closed position, the at least one partition member blocks the actuation path.

5. The aircraft engine of claim 4 wherein the at least one partition member includes first and second partition members, wherein when the feather valve is in the open position, the first partition member hydraulically separates the actuator from the drain, and wherein when the feather valve is in the closed position, the second partition member blocks the actuation path.

6. The aircraft engine of claim 4 further comprising a supply conduit connecting the source and the feather valve, an actuator conduit connecting the feather valve to the actuator, and a bypass conduit forming the bypass path, the supply conduit hydraulically connected to the actuator conduit via the bypass conduit independently of a position of the valve body within the casing.

7. The aircraft engine of claim 6 wherein a cavity within the casing connects the bypass conduit to the actuator conduit.

8. The aircraft engine of claim 6 wherein the bypass conduit is directly connected to the actuator conduit.

9. The aircraft engine of claim 1 further comprising a supply conduit connecting the source and the feather valve, an actuator conduit connecting the feather valve to the actuator, and a bypass conduit forming the bypass path, the bypass conduit permanently connecting the supply conduit to the actuator conduit.

10. A variable pitch propeller control system for a propeller having an actuator to control the pitch of blades, the blades having a feather position and a plurality of other positions different than the feather position, the variable pitch propeller control system comprising:
   a source of adjustable actuation hydraulic pressure hydraulically connected to the actuator and operable to vary a hydraulic pressure of a hydraulic fluid fed to the actuator for controlling the pitch of the blades,
   a feather valve having a casing and a valve body movably received within the casing, the feather valve having an inlet hydraulically connected to the source of adjustable actuation hydraulic pressure, a first outlet hydraulically connected to the actuator, and a second outlet hydraulically connected to a drain having a pressure below the actuation hydraulic pressure, the valve body movable within the casing between an open position of the feather valve and a closed position of the feather valve, wherein the open position provides an actuation path of
      the actuation hydraulic pressure between the source and the actuator through the feather valve and via the inlet and the first outlet while the inlet is hydraulically disconnected from the second outlet, the feather valve being in the open position for each of the plurality of other positions of the blades,
   wherein the closed position hydraulically connects, via the first outlet and the second outlet, the actuator to the drain and blocks the actuation path, the feather valve being in the closed position for the feather position of the blades, the inlet hydraulically disconnected from the first outlet in the closed position, and
   a bypass path in parallel with the actuation path, the bypass path having a restricted flow area relative to a flow area of the actuation path, the actuator hydraulically connected to the source of the adjustable actuation hydraulic pressure independently of whether the feather valve is in the open position or the closed position.

11. The variable pitch propeller control system of claim 10 wherein the bypass path forms a permanent, limited flow rate hydraulic connection from the source to the actuator when the feather valve is in the closed position.

12. The variable pitch propeller control system of claim 10 wherein the bypass path has a choke section forming the restricted flow area compared to an area of the actuation path.

13. The variable pitch propeller control system of claim 10 wherein the valve body has at least one partition member, and wherein when the feather valve is in the open position, the at least one partition member hydraulically separates the actuator from the drain, and wherein when the feather valve is in the closed position, the at least one partition member blocks the actuation path.

14. The variable pitch propeller control system of claim 13 wherein the at least one partition member includes first and second partition members, wherein when the feather valve is in the open position, the first partition member hydraulically separates the actuator from the drain, and wherein when the feather valve is in the closed position, the second partition member blocks the actuation path.

15. The variable pitch propeller control system of claim 13 further comprising a supply conduit connecting the source and the feather valve, an actuator conduit connecting the feather valve to the actuator, and a bypass conduit forming the bypass path, the supply conduit hydraulically connected to the actuator conduit via the bypass conduit independently of a position of the valve body within the casing.

16. The variable pitch propeller control system of claim 15 wherein a cavity within the casing connects the bypass conduit to the actuator conduit.

17. The variable pitch propeller control system of claim 15 wherein the bypass conduit is directly connected to the actuator conduit.

18. The variable pitch propeller control system of claim 10 further comprising a supply conduit connecting the source and the feather valve, an actuator conduit connecting the feather valve to the actuator, and a bypass conduit forming the bypass path, the bypass conduit permanently connecting the supply conduit to the actuator conduit.

19. A method of operating a variable pitch propeller, the method comprising:
   conveying a hydraulic fluid having an actuation hydraulic pressure from a source to an actuator via an actuation path in a feather valve, the actuator controlling a fine pitch of blades of the propeller;
   operating the feather valve to connect the actuator to a drain through the feather valve, thereby releasing the actuation hydraulic pressure in the actuator and causing a reverse flow of hydraulic fluid from the actuator to the drain through the feather valve via a flow path in the feather valve that is independent of the actuation path; and
   feeding a flow rate of hydraulic fluid from the source to a choked section of a bypass path, the choked section producing a limited flow rate of the hydraulic fluid having a pressure below the actuation hydraulic pressure, the limited flow rate flowing in parallel with the actuation path and into the reverse flow.

* * * * *